Jan. 14, 1947.  H. J. HEIM  2,414,376
WAVE GUIDE
Filed April 27, 1942
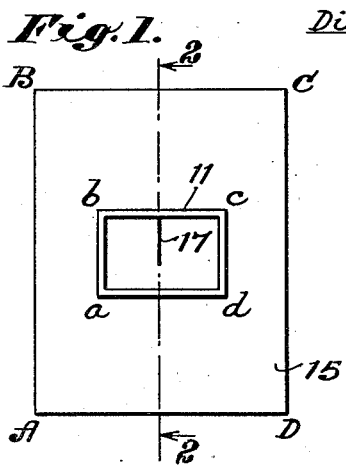
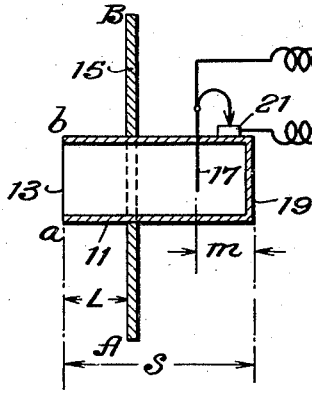
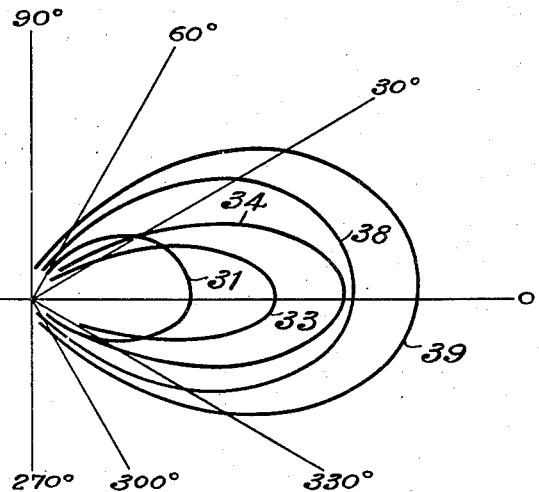
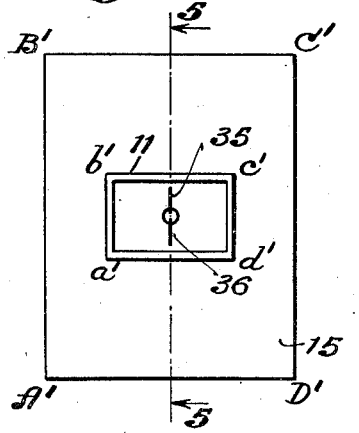
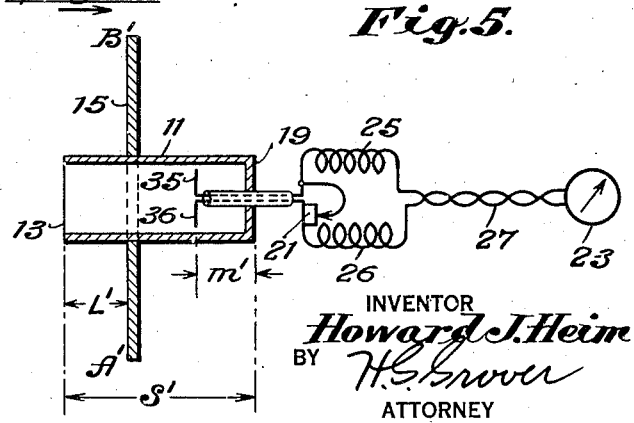
INVENTOR
*Howard J. Heim*
BY
*H. S. Grover*
ATTORNEY Patented Jan. 14, 1947

2,414,376

UNITED STATES PATENT OFFICE 2,414,376

WAVE GUIDE

Howard J. Heim, West Lafayette, Ind., assignor to Radio Corporation of America, a corporation of Delaware Application April 27, 1942, Serial No. 440,603

6 Claims. (Cl. 250—11)

This invention relates to wave guides and is concerned primarily with arrangements wherein higher degrees of directivity of reception are obtained than has heretofore been possible without the use of extensive and complicated apparatus.

In its essence the present invention comprises the use of a substantially rectangular wave guide element in which the antenna of either a single pole or a dipole type, for instance, may be placed. The complete wave guide is then located in a predetermined position relative to a baffle, and is preferably so arranged relative to the baffle that the wave guide protrudes through the baffle for a predetermined distance and is completely surrounded by the baffle. The end of the wave guide most remote from the antenna is then faced toward the signal radiator or source.

In one of its applications, the invention finds use in connection with receivers of signals of the type disclosed, for instance, by George Patent No. 2,216,707, wherein is disclosed an arrangement whereby aircraft may be guided. Therefore, in one of its applications, the invention is applicable to installation in the aircraft in such a way that the wave guide and baffle are positioned within the nose of the plane, and the openings are adapted to be covered up with some sort of plastic material through which received energy may pass. Such material may be of the nature of polystyrene which may readily be shaped to curve and conform to the contour of the aircraft so that the streamlining of the aircraft will not in any way be affected.

It is, accordingly, one of the objects of this invention to provide a wave guide arrangement for increasing the sensitivity and directivity of reception which is particularly adaptable for use in aircraft installations where lightweight equipment is particularly necessary.

Still further objects of the invention are to overcome and improve upon prior art arrangements, and to overcome one or more defects found to be existent therein, by apparatus which is relatively simple in its nature and construction.

Still further objects and advantages of the invention will naturally suggest themselves from a reading of the following specification and attached claims, taken in connection with the accompanying drawing, wherein, Fig. 1 illustrates a front view of the wave guide and baffle arrangement as particularly adapted for use with a single-ended antenna;

Fig. 2 is a sectional view, taken along the center line 2—2 of Fig. 1, looking in the direction of the arrows;

Fig. 3 is a series of curves plotted in polar coordinates to indicate the reception characteristics;

Fig. 4 is a front or plan view of an arrangement closely related to that of Fig. 1 but covering a modification wherein a dipole antenna is positioned within the wave guide for reception; and Fig. 5 is a sectional view taken on the center line or axis of rotation 5—5 of Fig. 4, looking in the direction of the arrows.

Referring now to the drawing, and first to Figs. 1 and 2 thereof, it will be seen that the wave guide section 11 is of a length represented by S, which may be of the order of ¾ the wave length of the signal to be received, although variance therefrom in increasing or decreasing limited amounts have been found for varying baffle sizes and wave guide openings. The opening at the end of the wave guide, represented by the configurations $a$, $b$, $c$ and $d$, in one form of device, is preferably of rectangular shaping with the dimensions $b$—$c$ and $a$—$d$ being of the order of two and one-half to three times the dimensions $a$—$b$ and $c$—$d$.

The open end 13 of the wave guide 11 is adapted to protrude through the baffle 15 for a distance represented by the dimension L, which is preferably of the order of approximately ⅜ the wave length to be received, with some variance here being permissible. Positioned within the wave guide 11 is a receiving antenna 17 of the single-ended type, which is located a distance $m$ from the closed end 19 of the guide. The antenna element 17 is connected to the wall of the wave guide through a crystal detector element 21, and thence to the load 23, herein conventionally represented by a microammeter, through a pair of high frequency chokes 25 and 26 and the twisted pair 27, as indicated.

The curves of Fig. 3 represent the reception characteristics for a predetermined wave length, which may be assumed, for instance, as 71 cm., for three different conditions of operation. By Fig. 3, curve 31 represents the characteristics of reception with no baffle used; curve 33 represents the reception where the baffle 15 has its dimensions A, D or B, C as thirty inches, and the dimensions A, B and C, D, thirty-six inches, with the wave guide dimensions $a$, $b$ and $c$, $d$ being six inches, and the dimensions $b$, $c$ and $a$, $d$ being fifteen inches, and from the same figure the curve 34 represents the reception when the baffle dimensions A, D and B, C are the same as for the curve 33, but the dimensions A, B and C, D are forty-four inches with the wave guide opening having the same dimensions as for curve 33.

Under such circumstances, the open end 13 of the wave guide protrudes beyond the baffle 15 for such a distance that the distance L is of the order of 26 cm. or 0.366 times the wave length for an assumed received wave length of 71 cm., for a condition where the wave guide 11 is a galvanized iron box. However, under another condition of test, where the wave guide was a copper box, the distance to which the open end 13 thereof protrudes beyond the baffle 15 was increased respectively for maximum reception to a distance corresponding to approximately 27 cm. or 0.386 times the wave length assumed to be received.

In a modified form of the arrangement, as shown by the construction represented in Figs. 4 and 5 and the diagrams 38 and 39 shown by Fig. 3, the system hereinabove described has been adapted to use with dipole antenna, and with such an arrangement maximum response in the load circuit, conventionally indicated by the microammeter 23, was found to occur when the baffle is slightly nearer the open end of the guide than in the conditions where a single-ended antenna was used.

With the arrangements of Figs. 4 and 5, the dipole antenna comprising the dipole pairs 35 and 36 is mounted within the wave guide element 11 and preferably located at a distance $m'$ from the closed end 19. Energy from the dipole is fed to the crystal detector 21, as disclosed particularly by Fig. 5.

In the preferred embodiment as shown by Figs. 4 and 5, for the dipole antenna it has been found that maximum response occurs when the open end 13 of the guide 11 protrudes beyond the baffle 15 for a distance $L'$ which is of the order of 23 cm. or approximately ⅓ of the wave length to be received, assuming the conditions for receiving 71 cm. waves. Likewise, the distance of the dipole elements 35 and 36 from the closed end 19 of the wave guide is shown by the distance represented as $m'$, which is of the order of 18 cm. or approximately ¼ the wave length to be received.

It has been found in practice that various modifications of the size of the wave guide and the baffle may be made without materially departing from the disclosure herein. However, for reference, the arrangement of Figs. 4 and 5, with the assumed locations of the open end of the guide relative to the baffle, and the dipole relative to the closed end of the guide, are preferably such that the rectangular opening is substantially a square, with the dimensions $a'$, $b'$ and $c'$, $d'$, or $a'$, $d'$ and $b'$, $c'$ each fifteen inches, and under such circumstances, the narrower dimension $A'$, $D'$ of the baffle 15 is preferably approximately thirty inches, with the longer dimension $A'$, $B'$ of the order of sixty-three inches, although it has further been found that the shorter of the two dimensions of the baffle may be reduced to approximately the width of the wave guide without appreciably affecting the sensitivity of response or of the directional properties.

Examples of the receptional characteristics of the wave guides represented by Figs. 4 and 5 are shown by the curves of Fig. 3, wherein curve 38 represents reception with a square wave guide ten inches deep, and curve 39 represents reception with a square wave guide twenty-three inches deep.

Many and various modifications may be made without departing from the spirit and scope of what has herein been disclosed and claimed.

Having described the invention, what is claimed is:

1. A wave guide for directional reception comprising an elongated wave guide element having a substantially rectangular cross section and having one closed end and one open end, a planar baffle element surrounding said wave guide and extending beyond the boundaries thereof for predetermined distances in each direction, said planar baffle element being spaced from the open end of the said wave guide for a distance of the order of a minor fraction of the wave length of the signals to be received, and a receiving antenna located within the wave guide and located at a distance of the order of a minor fraction of the wave length of the signals to be received from the closed end of the said guide where the second minor fraction is less than the first fraction.

2. A wave guide for directional reception comprising an elongated wave guide element having a substantially rectangular cross section and having one closed end and one open end, a planar baffle element surrounding said wave guide and extending beyond the boundaries thereof for predetermined distances in each direction, said planar baffle element being spaced from the open end of the said wave guide for a distance of the order of three-eighths the wave length of the signals to be received, and a receiving antenna located within the wave guide and located at a distance of the order of a quarter wave length of the signals to be received from the closed end of the said guide.

3. A wave guide for directional reception comprising an elongated wave guide element having a substantially rectangular cross section and having one closed end and one open end, a planar baffle element surrounding said wave guide and extending beyond the boundaries thereof for predetermined distances in each direction, said planar baffle element being spaced from the open end of the said wave guide for a distance of the order of three-eighths the wave length of the signals to be received, and a single-ended receiving antenna located within the wave guide and located at a distance of the order of a quarter wave length of the signals to be received from the closed end of the said guide.

4. The wave guide claimed in claim 2 wherein the antenna is a dipole.

5. The wave guide claimed in claim 1 comprising, in addition, a crystal detector supported by said wave guide, a connection between the antenna and the crystal, and a connection for supplying energy to a load circuit.

6. A device of the class described comprising an elongated wave guide element having a substantially rectangular cross section and having one closed end and one open end, a planar baffle element surrounding the wave guide element and extending beyond the boundaries thereof for predetermined distances in each direction, said planar baffle element being spaced from the open end of the wave guide for a distance substantially of the order of a minor fraction of the wave length of signalling energy to be transmitted through the wave guide element, and an antenna located within the said wave guide element and positioned at a distance corresponding substantially to a minor fraction of the wave length of signals to be transmitted through the wave guide from the closed end of said guide, where the said second minor fraction is less than the first minor fraction.

HOWARD J. HEIM.